(12) United States Patent
Kwon et al.

(10) Patent No.: US 11,862,789 B2
(45) Date of Patent: Jan. 2, 2024

(54) NEGATIVE ELECTRODE ACTIVE MATERIAL AND LITHIUM SECONDARY BATTERY INCLUDING THE SAME

(71) Applicant: LG ENERGY SOLUTION, LTD., Seoul (KR)

(72) Inventors: Yo Han Kwon, Daejeon (KR); Jae Hyun Lee, Daejeon (KR); Je Young Kim, Daejeon (KR); Yong Ju Lee, Daejeon (KR); In Sung Uhm, Daejeon (KR); Dong Chan Lee, Daejeon (KR); Joonwon Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 499 days.

(21) Appl. No.: 17/289,351

(22) PCT Filed: Oct. 28, 2019

(86) PCT No.: PCT/KR2019/014284
§ 371 (c)(1),
(2) Date: Apr. 28, 2021

(87) PCT Pub. No.: WO2020/091345
PCT Pub. Date: May 7, 2020

(65) Prior Publication Data
US 2021/0376312 A1    Dec. 2, 2021

(30) Foreign Application Priority Data
Oct. 29, 2018 (KR) .................. 10-2018-0130212

(51) Int. Cl.
*H01M 4/36* (2006.01)
*H01M 4/13* (2010.01)
(Continued)

(52) U.S. Cl.
CPC ............. *H01M 4/366* (2013.01); *H01M 4/13* (2013.01); *H01M 4/483* (2013.01); *H01M 4/625* (2013.01);
(Continued)

(58) Field of Classification Search
None
See application file for complete search history.

(56) References Cited

U.S. PATENT DOCUMENTS

2011/0129762 A1    6/2011  Lee et al.
2011/0229777 A1*   9/2011  Mak .................... H01M 8/1007
                                                    977/734
(Continued)

FOREIGN PATENT DOCUMENTS

CN    106463710 A      2/2017
EP    3 333 942 A1     6/2018
(Continued)

OTHER PUBLICATIONS

International Search Report (PCT/ISA/210) issued in PCT/KR2019/014284 dated Feb. 6, 2020.
(Continued)

*Primary Examiner* — Wyatt P McConnell
(74) *Attorney, Agent, or Firm* — Birch, Stewart, Kolasch & Birch, LLP

(57) ABSTRACT

A negative electrode active material that includes an active material core that allows the intercalation and deintercalation of lithium ions; and a conductive material that is attached to a surface of the active material core through an organic linker. The conductive material includes at least one selected from the group consisting of a linear conductive material and a planar conductive material. The organic linker is a compound that includes a hydrophobic structure and a substituent including a polar functional group.

11 Claims, 2 Drawing Sheets

(51) Int. Cl.
  *H01M 4/48* (2010.01)
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/027* (2013.01)

(56) References Cited

U.S. PATENT DOCUMENTS

| | | |
|---|---|---|
| 2011/0309293 A1 | 12/2011 | Moriuchi et al. |
| 2012/0116046 A1 | 5/2012 | Mak et al. |
| 2014/0001417 A1 | 1/2014 | Kim et al. |
| 2014/0212762 A1 | 7/2014 | Nakamura et al. |
| 2014/0255777 A1 | 9/2014 | Jeong et al. |
| 2015/0155563 A1 | 6/2015 | Iwasaki |
| 2015/0311504 A1 | 10/2015 | Hong et al. |
| 2017/0222212 A1 | 6/2017 | Hong et al. |
| 2018/0241076 A1 | 8/2018 | Nishiura et al. |
| 2019/0051897 A1 | 2/2019 | Kamo et al. |
| 2021/0184202 A1 | 6/2021 | Salem et al. |

FOREIGN PATENT DOCUMENTS

| | | |
|---|---|---|
| EP | 3 407 409 A1 | 11/2018 |
| JP | 2012-14993 A | 1/2012 |
| JP | 2012-502427 A | 1/2012 |
| JP | 2014-146519 A | 8/2014 |
| JP | 5598821 B2 | 10/2014 |
| JP | 2015-43316 A | 3/2015 |
| JP | 2015-179608 A | 10/2015 |
| KR | 10-2014-0110641 A | 9/2014 |
| KR | 10-2014-0135777 A | 11/2014 |
| KR | 10-2016-0149862 A | 12/2016 |
| KR | 10-2017-0044605 A | 4/2017 |
| KR | 10-2018-0117106 A | 10/2018 |
| WO | WO 2017/145853 A1 | 8/2017 |

OTHER PUBLICATIONS

Zhao et al., "Conductive Polymer Binder for High-Tap-Density Nanosilicon Material for Lithium-Ion Battery Negative Electrode Application", Nano Letters, 2015, vol. 15, No. 12, pp. 7927-7932.
Extended European Search Report for European Application No. 19880236.5, dated Nov. 4, 2021.

\* cited by examiner

[FIG. 1]
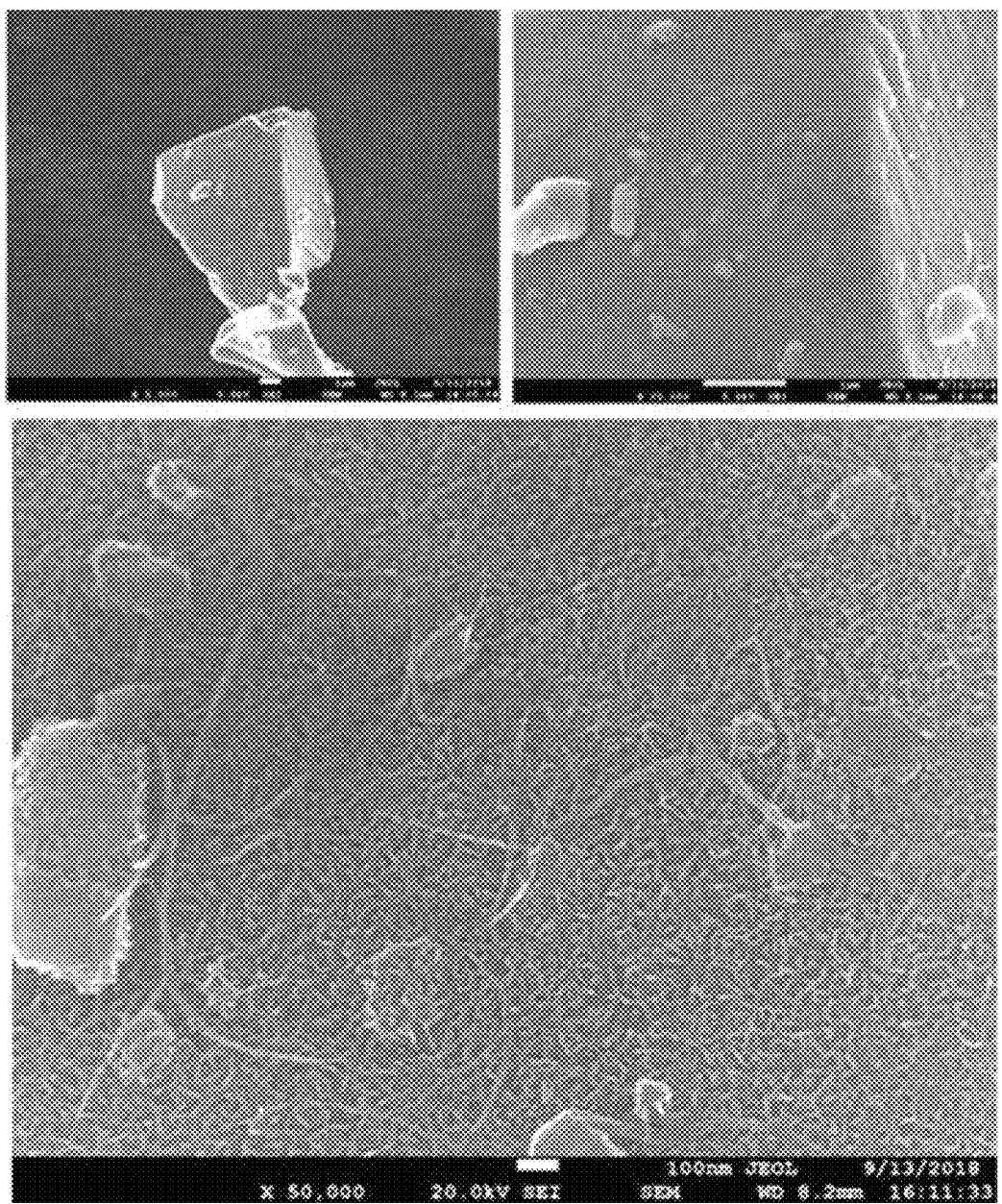

[FIG. 2]
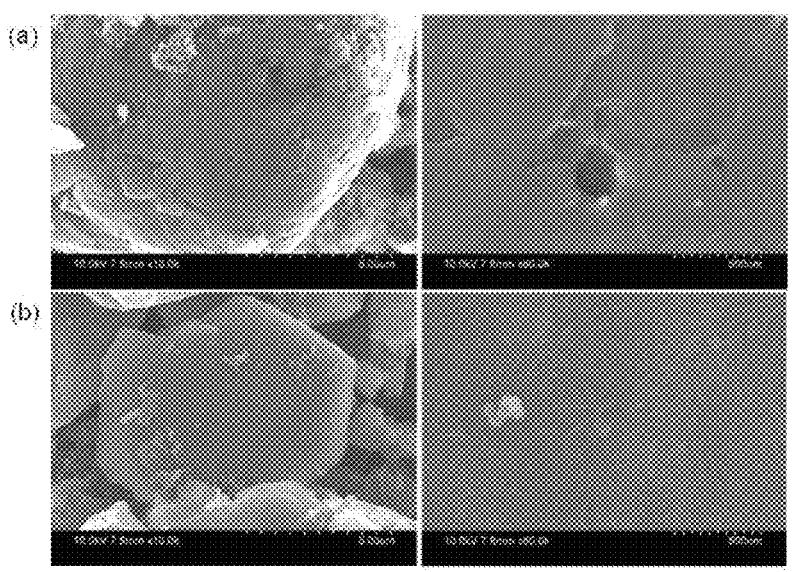
[FIG. 3]
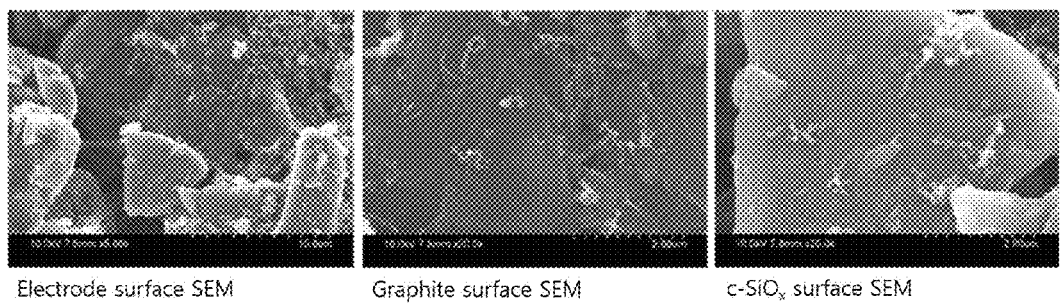
Electrode surface SEM Graphite surface SEM c-SiO$_x$ surface SEM

NEGATIVE ELECTRODE ACTIVE MATERIAL AND LITHIUM SECONDARY BATTERY INCLUDING THE SAME

CROSS-REFERENCE TO RELATED APPLICATION

This application claims priority to and the benefit of Korean Patent Application No. 10-2018-0130212, filed on Oct. 29, 2018, the disclosure of which is incorporated herein by reference in its entirety.

TECHNICAL FIELD

The present invention relates to a negative electrode active material and a lithium secondary battery that includes the negative electrode active material. More particularly, the present invention relates to a negative electrode active material having a surface to which a conductive material is stably attached through an organic linker and a lithium secondary battery that includes the negative electrode active material.

BACKGROUND ART

Due to a rapid increase in the use of fossil fuels, the demand for the use of an alternative energy source or clean energy source is increasing, and in line with this increasing demand, the fields of power generation and power storage using electrochemical reactions are being most actively studied.

A representative example of an electrochemical device that makes use of such electrochemical energy is a secondary battery, and application areas thereof are gradually expanding. Recently, as technologies for portable devices such as portable computers, mobile telephones, cameras, and the like are developed and demands for the portable devices increase, demands for secondary batteries as a power source are rapidly increasing, and among such secondary batteries, lithium secondary batteries having a high energy density, that is, lithium secondary batteries having high capacity, have been extensively studied, commercialized, and widely used.

Generally, secondary batteries consist of a positive electrode, a negative electrode, an electrolyte, and a separator. As a positive electrode active material constituting a positive electrode of a lithium secondary battery, metal oxides such as $LiCoO_2$, $LiMnO_2$, $LiMn_2O_4$, or $LiCrO_2$ have been used, and as a negative electrode active material constituting a negative electrode, materials such as metal lithium, carbon-based material (e.g., graphite, activated carbon, or the like), silicon oxides ($SiO_x$), or the like have been used. Among the negative electrode active materials, metal lithium was mainly used initially, but since the phenomenon whereby lithium atoms grew on a metal lithium surface, damaging the separator and accordingly damaging the battery, occurred as charging-discharging cycles progressed, carbon-based materials have been mainly used recently. However, since carbon-based materials have the disadvantage of small capacity, having a theoretical capacity of only about 400 mAh/g, various studies have been conducted to replace such carbon-based negative electrode active materials with high capacity materials such as silicon (Si) having a high theoretical capacity (4,200 mAh/g) and the like.

However, there is the problem that since materials having high capacity undergo an excessive volume change during charging and discharging, an electrical short circuit is caused in the electrode, and the phenomenon whereby a thick and unstable solid electrolyte interface (SEI) grows and results in degradation of battery performance occurs.

Conventionally, in order to address this problem, a method of forming a carbon coating layer on a surface of silicon-based particles or a method of using an additional conductive material has been attempted.

However, the method of forming a carbon coating layer has the problem that since a process of applying heat is required for the formation of the carbon coating layer, either cracks are generated or porosity is reduced in the silicon-based particles to reduce efficiency, and the method of using an additional conductive material has the problem that as the amount of conductive materials increases, the aggregation of conductive materials occurs.

Therefore, as disclosed in Korean Laid-Open Patent Application No. 10-2016-0149862, a method of further reinforcing control of a volume change by further providing a polymer composite on a carbon coating layer has been attempted. However, even if the additional polymer composite is provided, it is not easy to control the volume change, but rather, a problem that the conductivity of the active material is degraded, causing resistance to increase and the capacity retention rate of the battery to degrade, may occur. Also, since the silicon-based particles have an excessively thick coating layer such that lithium ions are not easily intercalated, there is a problem of a reduction in capacity.

Therefore, there is a demand for the development of a new technique capable of solving problems such as an electrical short circuit in an electrode, a performance degradation phenomenon, and the like which may be caused by the volume change of a high-capacity negative electrode active material.

RELATED-ART DOCUMENT

[Patent Document]
Korean Laid-Open Patent Application No. 10-2016-0149862

DISCLOSURE

Technical Problem

The present invention is directed to providing a high-capacity negative electrode active material that does not have the problem of an electrical short circuit in an electrode and has excellent conductivity.

The present invention is also directed to providing a negative electrode for a lithium secondary battery that includes the above-described negative electrode active material.

The present invention is also directed to providing a lithium secondary battery that includes the above-described negative electrode for a lithium secondary battery.

Technical Solution

One aspect of the present invention provides a negative electrode active material, which includes: an active material core that allows the intercalation and deintercalation of lithium ions; and a conductive material that is attached to a surface of the active material core through an organic linker, wherein the conductive material includes at least one selected from the group consisting of a linear conductive material and a planar conductive material, and the organic linker is a compound that includes a hydrophobic structure and a substituent including a polar functional group.

Another aspect of the present invention provides a negative electrode for a lithium secondary battery that includes: a negative electrode current collector; and a negative electrode active material layer formed on the negative electrode current collector, wherein the negative electrode active material layer includes: a negative electrode material including the above-described negative electrode active material; and a binder.

Still another aspect of the present invention provides a lithium secondary battery, which includes: the above-described negative electrode for a lithium secondary battery; a positive electrode, which is the opposite of the negative electrode for a lithium secondary battery; a separator interposed between the negative electrode for a lithium secondary battery and the positive electrode; and an electrolyte.

Advantageous Effects

In a negative electrode active material according to the present invention, a linear conductive material, a planar conductive material, or both a linear conductive material and a planar conductive material are attached, through an organic linker, to a surface of an active material core that allows the intercalation and deintercalation of lithium ions. Since the conductive material is firmly attached to a surface of the negative electrode active material through the organic linker, the linear conductive material can provide electrical conductivity that persists even when the volume of the negative electrode active material is changed, and therefore, improved stability can be exhibited.

DESCRIPTION OF DRAWINGS

FIG. 1 shows scanning electron microscope (SEM) images of a surface of a c-SiO$_x$/PBA/SWNT 0.3% negative electrode active material of Example 2.

FIG. 2 shows SEM images of a surface of a negative electrode prepared in Example 2, wherein FIG. 2A (top) shows a surface of graphite included in the negative electrode, and FIG. 2B (bottom) shows the surface of a c-SiO$_x$/PBA/SWNT 0.3% negative electrode active material.

FIG. 3 shows SEM images of a surface of a negative electrode prepared in Comparative Example 2.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "polycyclic ring" refers to a condensed ring or condensed nucleus, which is a ring in which two or more rings are linked while sharing two or more atoms thereof, unless otherwise noted.

As used herein, the term "alkyl group" refers to a straight-chain, cyclic, or branched hydrocarbon residue unless otherwise noted.

As used herein, the term "linear conductive material" refers to a conductive material of a cylindrical type, tube type, or the like having a fibrous structure unless otherwise noted, the term "planar conductive material" refers to a flat, sheet-shaped, or flake-like conductive material unless otherwise noted, and the term "particle-like conductive material" refers to a generally used conductive material which has the form of substantially spherical particles.

<Negative Electrode Active Material>

One aspect of the present invention provides a negative electrode active material, specifically, a negative electrode active material for a lithium secondary battery.

The negative electrode active material according to the present invention includes: an active material core that allows the intercalation and deintercalation of lithium ions; and a conductive material that is attached to a surface of the active material core through an organic linker, wherein the conductive material includes at least one selected from the group consisting of a linear conductive material and a planar conductive material, and the organic linker is a compound that includes a hydrophobic structure and a substituent including a polar functional group.

The linear conductive material or the planar conductive material is generally difficult to be dispersed in a solvent, and when it is intended to introduce the conductive materials to a surface of a negative electrode active material or to the inside of a negative electrode, the conductive materials are difficult to be introduced in a uniformly dispersed form due to the phenomenon whereby they are agglomerated due to attraction therebetween. Therefore, when the linear conductive material or the planar conductive material is to be used, it is usually used together with a dispersant (surfactant). However, since most dispersants are based on a weak attraction between materials, there is a difficulty in having the linear conductive material or the planar conductive material bonded in the negative electrode active material and thereby forming a stable electrical network, and when a volume change of the negative electrode active material occurs during charging and discharging, the phenomenon whereby the conductive material is detached from a surface of the negative electrode active material occurs. In this case, it is difficult to avoid a degradation in battery performance even though the linear conductive material or the planar conductive material has been introduced in order to maintain appropriate conductivity in response to the volume change of the negative electrode active material.

In order to address the above-described problem, the negative electrode active material of the present invention allows a conductive material to be firmly attached to a surface of an active material core through the organic linker so that the conductive material can stably provide electrical conductivity even when the volume of the negative electrode active material changes.

The active material core is not particularly limited as long as it allows the intercalation and deintercalation of lithium ions, but when it is a high-capacity material and undergoes a large volume change during charging and discharging, the effect of using the organic linker and a linear conductive material can be more advantageously exhibited. The active material core that allows the intercalation and deintercalation of lithium ions may be one or more selected from the group consisting of Si, SiO$_x$ (0<x<2), Sn, SnO$_2$, and an Si-metal alloy. Examples of a metal capable of forming such an Si-metal alloy include Al, Sn, Ag, Fe, Bi, Mg, Mn, Zn, In, Ge, Pb, and Ti, and examples of a metal oxide include SnO$_2$, TiO$_2$, Co$_3$O$_4$, Fe$_3$O$_4$, and Mn$_3$O$_4$.

The conductive material is attached to a surface of the active material core, and specifically, the conductive material may be attached to a surface of the active material core through an organic linker.

The conductive material may be at least one selected from the group consisting of a linear conductive material and a planar conductive material. Specifically, when the conductive material is a linear conductive material, it may be in linear contact with or attached to the active material core, and when the conductive material is a planar conductive material, it may be in contact with the active material core in a face-to-face manner, and therefore, stable electrical connection can be achieved. Since the conductive material is therefore positioned between two or more active materials while crossing the active materials, the conductive material allows an electrical contact between the negative electrode active materials to be increased. Therefore, the phenomenon whereby an electrical network is disconnected due to a change in the volume, position, or morphology of the negative electrode active material can be minimized, and further, an increase in the resistance of a negative electrode due to the disconnection of an electrical network can be suppressed.

The conductive material is electrochemically stable and has high conductivity, and includes a linear conductive material, a planar conductive material, or both. The linear conductive material may form a fibrous structure, and may be one or more selected from the group consisting of a carbon fiber, a carbon nanofiber (CNF), a metal fiber, a carbon nanotube (CNT), and a conductive whisker, specifically a carbon fiber, more specifically a CNT. In addition, the planar conductive material may be flat, sheet-shaped, or flake-like, and may be one or more selected from the group consisting of graphene, a metal thin film, and a MXene.

The conductive material may be included in the negative electrode active material in an amount of 0.05 part by weight to 12 parts by weight, preferably 0.25 part by weight to 3 parts by weight, relative to 100 parts by weight of the active material core. It is preferred that the content of the conductive material is in the above-described range because, within this range, it is possible to sufficiently form an electrical network of the active material while preventing the initial efficiency and capacity of the active material from being lowered due to an excessive addition of a conductive material.

The organic linker is a material that is interposed between a surface of the active material core and the conductive material and allows the same to be attached to each other. Specifically, the organic linker may impart a bonding ability between the conductive material and a surface of the active material.

The organic linker is a compound that includes a hydrophobic structure and a substituent including a polar functional group in a molecular structure thereof.

The hydrophobic structure of the organic linker interacts with and is bonded to the conductive material by van der Waals attraction. Specifically, a conjugated π-electron of a ring having a π-electron conjugated structure may form a van der Waals bond with a π electron included in the conductive material, or an electron of alkylene may form a van der Waals bond with an electron of the conductive material.

The substituent of the organic linker, which includes a polar functional group, may be substituted on a ring having a π-electron conjugated structure of the organic linker or on an alkylene structure of the organic linker, and may be bonded to a functional group (e.g., —OH group) located on a surface of the active material core, thereby allowing the organic linker and a linear conductive material bonded to the organic linker to be attached to the surface of the active material core.

In addition, since the substituent including a polar functional group has excellent affinity with solvents, the substituent may allow the organic linker to be effectively dispersed in a solvent and, accordingly, a linear conductive material bonded to the organic linker to be effectively dispersed (i.e., debundled) in the solvent without being agglomerated.

The substituent including a polar functional group may be linked to a surface of the active material core by being bonded to a functional group, specifically a functional group including —OH, located on the surface of the active material core. The functional group located on the surface of the active material core and including —OH may be formed as the surface of the active material core is oxidized by oxygen in the air. Since the bonding between the substituent including a polar functional group and a functional group including —OH is a chemical bond and thus the organic linker and the linear conductive material are strongly attached to the active material core, an effect of maintaining stable electrical conductivity even when the volume of the active material core changes can be provided.

In the negative electrode active material according to one exemplary embodiment of the present invention, the state in which the active material core, the organic linker, and the conductive material are bonded may be expressed as "active material core:chemical bonding of polar functional group with —OH group in active material core:organic linker:π-π interaction:conductive material."

The hydrophobic structure may include one or more selected from the group consisting of a ring having a π-electron conjugated structure and a C3-C20 alkylene structure.

The ring having a π-electron conjugated structure may refer to an aromatic ring in which the number of electrons satisfies the "4n+2 rule," specifically two or more rings which are linked, more specifically two or more rings making up a condensed ring structure. The ring having a π-electron conjugated structure may include, for example, one or more selected from the group consisting of benzene, pyrene, naphthalene, anthracene, benzopyrene, phenanthrene, fluoranthene, chrysene, perylene, benz[a]anthracene, acenaphthylene, coronene, triphenylene, and tetracene.

In one exemplary embodiment of the present invention, the ring having a x-electron conjugated structure may be a polycyclic ring in which four or more rings are linked. The "polycyclic ring in which four or more rings are linked" may include the states in which polycyclic rings include four or more rings on the inside thereof, and may include one or more selected from the group consisting of pyrene, benzopyrene, fluoranthene, chrysene, perylene, benz[a]anthracene, coronene, triphenylene, and tetracene.

In addition, the alkylene structure may be a C3-C20 alkylene structure.

Meanwhile, the substituent of the organic linker, which includes a polar functional group, may be one or more selected from the group consisting of a carboxyl group; a carboxylate group; a phosphoric acid group; a phosphate group; a sulfuric acid group; a sulfate group; and a C1-C8 alkyl group substituted with a carboxyl group, a carboxylate group, a phosphoric acid group, a phosphate group, a sulfuric acid group, or a sulfate group, and is preferably one or more selected from the group consisting of a carboxyl group; and a carboxylate group in terms of the fact that the bonding thereof with a polar functional group in the active material core is excellent.

In one exemplary embodiment of the present invention, the organic linker may be one or more selected from the group consisting of 1-pyreneacetic acid, 1-pyrenecarboxylic acid, 1-pyrenebutyric acid, sodium dodecyl sulfonate (SDS), and sodium dodecylbenzenesulfonate (SDBS). The organic linker is preferably 1-pyrenebutyric acid. In this case, in terms of the fact that since the compound has an excellent ability to be bonded to a polar functional group located on a surface of the active material due to the inclusion of a carboxyl group and the compound includes an appropriate amount of linear alkylene groups and thus allows for the improvement of the degree of freedom of the conductive material and the formation of a flexible conductive network between negative electrode active materials, the lifetime characteristics of a battery can be advantageously improved. In addition, the organic linker being 1-pyrenebutyric acid is desirable in terms of the fact that when mixing the organic linker and a conductive material in the preparation of a negative electrode active material, the dispersibility of the conductive material can be improved due to the excellent polarity of a carboxylate group in the organic linker and therefore, the conductive material can be uniformly placed at a surface of the negative electrode active material.

In addition, the negative electrode active material according to one exemplary embodiment of the present invention may include, as the organic linker, a mixture of two different organic linkers, that is, a mixture of a first organic linker compound and a second organic linker compound.

The first organic linker compound may be a compound that includes a ring having a π-electron conjugated structure and a substituent including a polar functional group, and the second organic linker compound may be: a compound that includes a C3-C20 alkylene structure and a polar functional group; a compound that includes a ring having a π-electron conjugated structure, a C3-C20 alkylene structure, and a polar functional group; or a mixture thereof.

When a mixture of the first organic linker compound and the second organic linker compound is used as the organic linker, the conductive material may be more effectively dispersed in a solvent during the preparation of the negative electrode active material, and since the conductive material is therefore attached to a surface of the active material core in a more effectively dispersed manner, the conductive material can be more uniformly positioned at the surface of the active material core.

According to one exemplary embodiment of the present invention, the organic linker may include the first organic linker compound and the second organic linker compound at a weight ratio of 1:99 to 99:1, specifically 5:95 to 95:5, more specifically 10:90 to 90:10. When the first organic linker compound and the second organic linker compound satisfy the above-described weight ratio, the conductive material can be more effectively dispersed, and the conductive material may be more effectively attached to the active material core.

According to one exemplary embodiment of the present invention, the first organic linker compound may be one or more selected from the group consisting of 1-pyreneacetic acid, 1-pyrenecarboxylic acid, and 1-pyrenebutyric acid, and the second organic linker compound may be one or more selected from the group consisting of SDS and SDBS.

The average particle diameter ($D_{50}$) of the negative electrode active material according to one exemplary embodiment of the present invention may be 0.01 to 30 μm, specifically 0.5 to 30 μm, more specifically 1 to 20 μm. When the average particle diameter of the negative electrode active material satisfies the above-described range, the negative electrode may have an appropriate capacity per volume due to having an appropriate density, and it is possible to prevent the of the negative electrode from becoming excessively thick due to the volume expansion of the negative electrode active material.

In the present invention, the average particle diameter ($D_{50}$) of the negative electrode active material may be defined as a particle diameter corresponding to the $50^{th}$ percentile in the particle diameter distribution curve. Although not particularly limited, the average particle diameter may be measured using, for example, a laser diffraction method or a scanning electron microscope (SEM) image. The laser diffraction method generally allows for the measurement of a particle diameter ranging from a submicron level to several millimeters, and may produce a result having high reproducibility and high resolution.

The negative electrode active material according to one exemplary embodiment of the present invention may be prepared by a method including first dispersing the organic linker and the conductive material in a solvent, and then adding a material that serves as a core of the negative electrode active material to the resultant. As a result, the organic linker is effectively dispersed in the solvent such that the conductive material becomes effectively dispersed (i.e., debundled) in the solvent without being agglomerated, and since a material that serves as a core of the active material is added to an assembled body consisting of the organic linker and the conductive material which have been dispersed, the organic linker and the conductive material can be evenly dispersed and bonded to the active material core.

Specifically, when dispersing the organic linker and the conductive material, a base (e.g., NaOH) may also be added to the solvent. Since the base may allow a polar functional group of the organic linker to have ionic characteristics or strong polarity, the dispersion in the solvent can be made easy, and the bonding between a functional group (—OH) of a surface of the active material core and a polar functional group in the organic linker can be made easy. When the base is not added to the solution along with the above-described components, there is a risk that the organic linker may not be dispersed in the solution, and since it may be difficult for the polar functional group of the organic linker to react with a surface of the active material core, the formation of the negative electrode active material of the present invention may be difficult to achieve.

In this case, the process of dispersing the organic linker and the conductive material in the solvent and the process of adding the material serving as a core of the active material may be carried out by a conventional mixing method, for example, a milling method such as a sonication method, a ball-milling method, a bead-milling method, a basket-milling method, or the like or a method using a mixing device such as a homogenizer, a bead mill, a ball mill, a basket mill, an attrition mill, a universal stirrer, a clear mixer, a TK mixer, or the like.

<Negative Electrode for Lithium Secondary Battery and Lithium Secondary Battery>

Other aspects of the present invention provide a negative electrode for a lithium secondary battery, which includes the above-described negative electrode active material, and a lithium secondary battery.

Specifically, the negative electrode for a lithium secondary battery includes: a negative electrode current collector; and a negative electrode active material layer formed on the negative electrode current collector, and the negative electrode active material layer includes: a negative electrode material including the above-described negative electrode active material; and a binder.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, etc., an aluminum-cadmium alloy, or the like may be used.

The negative electrode current collector may typically have a thickness of 3 to 100 μm.

The negative electrode current collector may have fine irregularities formed in a surface thereof to increase the adhesion of the negative electrode active material. For example, the negative electrode current collector may be used in any of various forms such as a film, a sheet, a foil, a net, a porous material, a foam, a non-woven fabric, and the like.

The negative electrode active material layer is formed on the negative electrode current collector, and includes: a negative electrode material including the above-described negative electrode active material; and a binder.

The negative electrode material may further include a carbon-based active material along with the above-described negative electrode active material. The carbon-based active material may impart excellent cycle characteristics or excellent battery lifetime characteristics to the negative electrode or the secondary battery of the present invention.

Specifically, the carbon-based active material may include at least one selected from the group consisting of graphite, artificial graphite, natural graphite, hard carbon, soft carbon, carbon black, acetylene black, Ketjen black, Super P, graphene, and fibrous carbon, preferably at least one selected from the group consisting of graphite, artificial graphite, and natural graphite.

Specifically, it is preferred that both the negative electrode active material and the carbon-based active material are used for the negative electrode material in terms of simultaneously improving capacity characteristics and cycle characteristics, and specifically, it is preferred that the negative electrode material includes the negative electrode active material and the carbon-based active material at a weight ratio of 5:95 to 50:50, preferably 20:80 to 40:60, in terms of simultaneously improving capacity and cycle characteristics.

The negative electrode material may be included in an amount of 80 wt % to 99 wt %, preferably 85 wt % to 96 wt %, in the negative electrode active material layer.

The negative electrode active material layer includes a binder. The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated-EPDM, styrene-butadiene rubber (SBR), fluororubber, polyacrylic acid, and materials in which hydrogens thereof have been substituted with Li, Na, Ca, etc., and various copolymers thereof.

The negative electrode active material layer may include an additional conductive material, or may not include a separate additional conductive material.

The additional conductive material is not particularly limited as long as it does not cause a chemical change in the battery and has conductivity, and, for example, the following may be used: graphite such as natural graphite, artificial graphite, or the like; carbon black such as acetylene black, Ketjen black, channel black, furnace black, lamp black, thermal black, or the like; a conductive fiber such as carbon fiber, metal fiber, or the like; a conductive tube such as a CNT; fluorocarbon; a metal powder such as aluminum powder, nickel powder, or the like; a conductive whisker such as zinc oxide, potassium titanate, or the like; a conductive metal oxide such as titanium oxide or the like; and a conductive material such as a polyphenylene derivative or the like.

The thickness of the negative electrode active material layer may be 10 μm to 200 μm, preferably 20 μm to 150 μm.

The negative electrode for a lithium secondary battery may be prepared by applying a negative electrode slurry including a negative electrode material, a binder, a conductive material, and/or a solvent for forming a negative electrode slurry onto the negative electrode current collector, and then carrying out drying and rolling.

The solvent for forming a negative electrode slurry may be an organic solvent such as N-methyl pyrrolidone (NMP), dimethyl formamide (DMF), acetone or dimethyl acetamide, or water or the like, and these solvents may be used alone or in a combination of two or more.

In addition, the present invention provides a lithium secondary battery, which includes: the above-described negative electrode for a lithium secondary battery; a positive electrode, which is the opposite of the negative electrode for a lithium secondary battery; a separator interposed between the negative electrode for a lithium secondary battery and the positive electrode; and an electrolyte.

The negative electrode for a lithium secondary battery has been described above.

The positive electrode may include: a positive electrode current collector; and a positive electrode active material layer formed on the positive electrode current collector and including a positive electrode active material.

In the positive electrode, the positive electrode current collector is not particularly limited as long as it does not cause a chemical change in the battery and has conductivity, and, for example, stainless steel, aluminum, nickel, titanium, calcined carbon, aluminum or stainless steel whose surface has been treated with carbon, nickel, titanium, silver, etc., or the like may be used. In addition, the positive electrode current collector may typically have a thickness of 3 μm to 500 μm, and may have fine irregularities formed in a surface thereof to increase the adhesion of the positive electrode active material. For example, the positive electrode current collector may be used in any of various forms such as a film, a sheet, a foil, a net, a porous material, a foam, a non-woven fabric, and the like.

The positive electrode active material may be a typically used positive electrode active material. Specifically, examples of the positive electrode active material may include: a layered compound such as a lithium cobalt oxide ($LiCoO_2$), a lithium nickel oxide ($LiNiO_2$), $Li[Ni_xCo_yMn_zM_v]O_2$ (here, M is any one or more elements selected from the group consisting of Al, Ga, and In; and $0.3 \leq x < 1.0$, $0 \leq y$, $z \leq 0.5$, $0 \leq v \leq 0.1$, and $x+y+z+v=1$), $Li(Li_aM_{b-a-b'}M'_{b'})O_{2-c}A_c$ (here, $0 \leq a \leq 0.2$, $0.6 \leq b \leq 1$, $0 \leq b' \leq 0.2$, and $0 \leq c \leq 0.2$; M includes Mn and one or more selected from the group consisting of Ni, Co, Fe, Cr, V, Cu, Zn, and Ti; M' is one or more selected from the group consisting of Al, Mg, and B, and A is one or more selected from the group consisting of P, F, S, and N), or the like or a compound substituted with one or more transition metals; a lithium manganese oxide such as one represented by the chemical formula $Li_{1+y}Mn_{2-y}O_4$ (here, y is 0 to 0.33), $LiMnO_3$, $LiMn_2O_3$, $LiMnO_2$, or the like; a lithium copper oxide ($Li_2CuO_2$); a vanadium oxide such as $LiV_3O_8$, $LiFe_3O_4$, $V_2O_5$, $Cu_2V_2O_7$, or the like; a Ni-site-type lithium nickel oxide represented by the chemical formula $LiNi_{1-y}M_yO_2$ (here, M=Co, Mn, Al, Cu, Fe, Mg, B, or Ga, and y is 0.01 to 0.3); a lithium manganese composite oxide represented by the chemical formula $LiMn_{2-y}M_yO_2$ (here, M=Co, Ni, Fe, Cr, Zn, or Ta, and y is 0.01 to 0.1) or $Li_2Mn_3MO_8$ (here, M=Fe, Co, Ni, Cu, or Zn); $LiMn_2O_4$ in which some Li in the chemical formula have been substituted with alkaline earth metal ions; a disulfide compound; $Fe_2(MoO_4)_3$; and the like, but the present invention is not limited thereto. The positive electrode may be a Li-metal.

The positive electrode active material layer may include a positive electrode conductive material and a positive electrode binder along with the above-described positive electrode active material.

Here, the positive electrode conductive material is used to impart conductivity to the electrode, and may be used without particular limitation as long as it does not cause a chemical change in a battery being produced and has electron conductivity. Specific examples of the positive electrode conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber of copper, nickel, aluminum, silver, or the like; a conductive whisker such as zinc oxide, potassium titanate, or the like; a conductive metal oxide such as titanium oxide or the like; and a conductivity polymer such as a polyphenylene derivative or the like, which may be used alone or in combination of two or more thereof.

In addition, the positive electrode binder serves to improve the adhesion between positive electrode active material particles and the adhesion between the positive electrode active material and a positive electrode current collector, Specific examples of the positive electrode binder include PVDF, PVDF-co-HFP polyvinyl alcohol, polyacrylonitrile, CMC, starch, hydroxypropyl cellulose, regenerated cellulose, polyvinylpyrrolidone, polytetrafluoroethylene, polyethylene, polypropylene, an EPDM, a sulfonated-EPDM, SBR, fluororubber, various copolymers thereof and the like, which may be used alone or in combination of two or more thereof.

The separator is used to separate the negative electrode from the positive electrode and provide a passage for lithium ion migration. As the separator, a separator commonly used in a secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a common porous non-woven fabric, for example, a non-woven fabric made of high-melting-point glass fiber, polyethylene terephthalate fiber, or the like may be used. Also, in order to ensure heat resistance or mechanical strength, a coated separator that includes a ceramic component or polymer material and is optionally in a single-layer or multi-layer structure may be used.

Examples of the electrolyte include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydro furan, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl pyropionate, ethyl propionate, or the like may be used.

In particular, among the carbonate-based organic solvents, ethylene carbonate and propylene carbonate, which are cyclic carbonates, can be suitably used because they are highly viscous organic solvents that have high dielectric constants and thus effectively dissociate lithium salts. Such a cyclic carbonate can be more suitably used because it may yield an electrolyte having high electrical conductivity when mixed with a linear carbonate having low viscosity and a low dielectric constant, such as dimethyl carbonate or diethyl carbonate, in an appropriate ratio.

A lithium salt may be used as the metal salt, and the lithium salt is easily dissolved in the non-aqueous electrolyte. For example, the anion of the lithium salt may be one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the above-described electrolyte components, the electrolyte may further include one or more additives, for example, a haloalkylene carbonate-based compound such as difluoroethylene carbonate and the like, pyridine, triethylphosphite, triethanolamine, cyclic ether, ethylenediamine, n-glyme, hexamethyl phosphoric triamide, a nitrobenzene derivative, sulfur, a quinone imine dye, N-substituted oxazolidinone, N,N-substituted imidazolidine, an ethylene glycol dialkyl ether, an ammonium salt, pyrrole, 2-methoxyethanol, aluminum trichloride, or the like for the purpose of improving battery lifetime characteristics, suppressing a reduction in battery capacity, improving battery discharge capacity, and the like.

According to another embodiment of the present invention, there is provided a battery module that includes the secondary battery as a unit cell and a battery pack that includes the battery module. Due to the inclusion of the secondary battery that has high capacity, high rate capability, and excellent cycle characteristics, the battery module and the battery pack can be used as a power source for medium-to-large-sized devices selected from the group consisting of electric vehicles, hybrid electric vehicles, plug-in hybrid electric vehicles, and a system for storing electric power.

EXAMPLES

Hereinafter, exemplary embodiments will be provided to facilitate understanding of the present invention, but it will be apparent to those skilled in the art that the exemplary embodiments are merely illustrative of the present disclosure, and that various changes and modifications can be made within the scope and technical spirit of the present disclosure and are encompassed in the scope of the appended claims.

Example 1

<Preparation of c-$SiO_x$ Particles>

The c-$SiO_x$ particles refer to $SiO_x$ on which a carbon coating layer has been formed, and were prepared by the following method. After mixing $SiO_x$ (x=approximately 1) particles having an average particle diameter ($D_{50}$) of 5 μm and a petroleum-based pitch at a weight ratio of 93:7, the resultant was thermally treated for two hours at a temperature of 950° C. (temperature elevation rate: 5° C./min) in a calcination furnace under an Ar atmosphere, and thereby a carbon coating layer was formed on the $SiO_x$ particles. The weight ratio of the $SiO_x$ particles and the carbon coating layer was 95:5.

<Preparation of c-$SiO_x$/PBA/SWNT 10%>

1 g of 1-pyrenebutyric acid (PBA) was dissolved in 250 g of a 0.5 M aqueous NaOH solution. After adding 0.1 g of single-walled carbon nanotubes (SWNTs) to the prepared solution and then carrying out probe-type sonication for 30 minutes, 1 g of the c-$SiO_x$ prepared above was added to the prepared solution, followed by 30-minute probe-type sonication and subsequent one-hour stirring. The dispersion solution prepared as thus was filtered and then washed by carrying out filtration while pouring water several times. The obtained material was dried for 12 hours in a vacuum oven at 130° C., and thereby a negative electrode active material, c-$SiO_x$/PBA/SWNT 10% (indicating the wt % of SWNTs relative to c-$SiO_x$), was finally obtained.

Using the above-described negative electrode active material, a negative electrode for evaluating battery performance was prepared as follows. The c-$SiO_x$/PBA/SWNT 10%, graphite, Super-C, and PVDF in a weight ratio of 31.5:58.5:4:6 were added to NMP to prepare a slurry. Subsequently, the slurry was applied to a copper foil and dried for two hours at about 130° C., and thereby a negative electrode was obtained.

Example 2

<Preparation of c-$SiO_x$/PBA/SWNT 0.3%>

0.03 g of PBA was dissolved in 100 g of a 0.5 M aqueous NaOH solution. After adding 0.003 g of SWNTs to the prepared solution and then carrying out probe-type sonication for 30 minutes, 1 g of the c-$SiO_x$ prepared in the process of Example 1 was added to the prepared solution, followed by 30-minute sonication and subsequent one-hour stirring.

Afterward, a negative electrode active material, c-$SiO_x$/PBA/SWNT 0.3% (indicating the wt % of SWNTs relative to c-$SiO_x$), and a negative electrode including the same were prepared in the same manner as in Example 1.

Example 3

<Preparation of c-$SiO_x$/PBA/SWNT 0.2%>

0.02 g of PBA was dissolved in 100 g of a 0.5 M aqueous NaOH solution. After adding 0.002 g of SWNTs to the prepared solution and then carrying out probe-type sonication for 30 minutes, 1 g of the c-$SiO_x$ prepared in the process of Example 1 was added to the prepared solution, followed by 30-minute sonication and subsequent one-hour stirring.

Afterward, a negative electrode active material, c-$SiO_x$/PBA/SWNT 0.2% (indicating the wt % of SWNTs relative to c-$SiO_x$), and a negative electrode including the same were prepared in the same manner as in Example 1.

Comparative Examples

Comparative Example 1

In Comparative Example 1, a negative electrode was prepared in the same manner as in Example 1 by using the c-$SiO_x$ prepared in Example 1 as a negative electrode active material except that a negative electrode slurry in which c-$SiO_x$, graphite, Super-C, and PVDF were mixed in a weight ratio of 31.5:58.5:4:6 was prepared.

Comparative Example 2

In Comparative Example 2, a negative electrode was prepared in the same manner as in Example 1 by using the c-$SiO_x$ prepared in Example 1 as a negative electrode active material except that a negative electrode slurry in which c-$SiO_x$, graphite, SWNTs, Super-C, and PVDF were mixed in a weight ratio of 31.5:58.4:0.1:4:6 was prepared.

Comparative Example 3

In Comparative Example 3, a negative electrode was prepared in the same manner as in Example 1 by using the c-$SiO_x$ prepared in Example 1 as a negative electrode active material except that a negative electrode slurry in which c-$SiO_x$, graphite, SWNTs, PBA, Super-C, and PVDF were mixed in a weight ratio of 31.1:57.8:0.1:1:4:6 was prepared.

Experimental Examples

Coin-type half-cells were manufactured using the negative electrodes prepared in Examples 1 to 3 and Comparative Examples 1 to 3. A metal lithium foil was used as the positive electrode, and an electrode assembly was manufactured by interposing a polyethylene separator between the negative electrode and the positive electrode.

After placing the electrode assembly in a battery case, an electrolyte prepared by adding 1 M $LiPF_6$ to a non-aqueous solvent which includes a 1:2 (volume ratio) mixture of ethylene carbonate and diethyl carbonate was injected, and thereby a coin-type half-cell was obtained.

Experimental Example 1: Charging and Discharging Characteristics of Battery

The charging and discharging characteristics of the coin-type half-cells manufactured using the negative electrodes prepared in Examples 1 to 3 and Comparative Examples 1 to 3 were evaluated.

A first cycle of charging/discharging was carried out at a current density of 0.1 C/0.1 C, and the following 100 cycles of charging/discharging were carried out at a current density of 0.5 C/0.5 C, and detailed conditions thereof are as follows. The charging was carried out with a constant current at a predetermined current density to 5 mV and then with a constant voltage maintained at 5 mV, and was terminated when the current density reached 0.005 C. The discharging was carried out in a CC mode to 1 V at a predetermined current density until completion. The results are summarized in Table 1.

TABLE 1

|  | 0.1 C charge capacity (mAh/g) | 0.1 C discharge capacity (mAh/g) | Initial efficiency (%) | Capacity retention rate (@ 100 cycles) |
| --- | --- | --- | --- | --- |
| Example 1 | 895.3 | 659.4 | 73.7 | 96.0% |
| Example 2 | 914.8 | 743.4 | 81.3 | 93.3% |
| Example 3 | 893.7 | 732.6 | 82.0 | 87.2% |
| Comparative Example 1 | 846.6 | 781.4 | 80.5 | 25% (@ 25 cycles) |
| Comparative Example 2 | 920.1 | 757.6 | 82.3 | 60.6% |
| Comparative Example 3 | 908.7 | 720.7 | 79.3 | 5% |

As can be seen from Table 1, the cycle lifetime characteristics of the coin-type batteries according to Examples 1 to 3 were significantly improved compared to Comparative Example 1. It is determined that in Examples 1 to 3, the cycle lifetime characteristics of the negative electrode active material were improved due to the inclusion of a PBA organic linker, and it can be seen that particularly in the case of Example 2, even though SWNTs were included in an amount of only 0.3 wt %, the lifetime characteristics were significantly improved compared to Comparative Example 1 and initial efficiency and discharge capacity were significantly improved.

It is determined that this is because the SWNTs have stably formed a conductive network on a surface of the active material through the organic linker, and it is determined that since it is therefore possible to electrically connect the surface of the active material while suppressing the destruction of the high-capacity active material during the charging and discharging of the battery, improved battery characteristics can be achieved.

Experimental Example 2: Evaluation Based on SEM Observation

FIG. 1 shows SEM images of a surface of the c-SiO$_x$/PBA/SWNT 0.3% negative electrode active material of Example 2, and it can be seen that a CNT network has been stably formed on a surface of the carbon-coated SiO$_x$.

FIGS. 2 and 3 are SEM images of surfaces of the negative electrodes prepared in Example 2 and Comparative Example 2, wherein FIG. 2A (top) shows a surface of graphite included in the negative electrode, FIG. 2B (bottom) shows the surface of the c-SiO$_x$/PBA/SWNT 0.3% negative electrode active material, and FIG. 3 shows a surface of the negative electrode prepared in Comparative Example 2.

Referring to FIG. 2, it can be seen that whereas in the case of the negative electrode prepared in Example 2, the SWNTs are present only on the surface of c-SiO$_x$ and not on the surface of graphite, in the case of the negative electrode prepared in Comparative Example 2 and shown in FIG. 3, the SWNTs are also present on a graphite surface (SWNTs, that is, CNTs, appear as light-colored lines present on the surface of graphite or of c-SiO$_x$). Although in Comparative Example 2, the SWNTs were included in the negative electrode slurry in the same or similar amount as that included in the negative electrode active material of Example 2 in the preparation of the negative electrode, since the SWNTs surround graphite which has excellent inherent electrical conductivity as well as they surround c-SiO$_x$, it can be seen that the desired effect, that is, the effect of imparting effective/high electrical conductivity to a high-capacity active material with large volume expansion, such as c-SiO$_x$, is small relative to the amount of the SWNTs used. This means that in the case of Comparative Example 2, a higher negative-electrode manufacturing cost compared to Example 2 is required, and since CNTs having high irreversibility are used, the initial efficiency of the negative electrode may be reduced.

That is, in the negative electrode active material of the present invention, an effective electrical network can be formed on a surface of a high-capacity active material using a small amount of CNTs, and therefore, an effect of significantly improving battery performance can be achieved.

The invention claimed is:

1. A negative electrode active material comprising:
   an active material core that allows intercalation and deintercalation of lithium ions; and
   a conductive material attached to a surface of the active material core through an organic linker,
   wherein the conductive material comprises at least one selected from the group consisting of a linear conductive material and a planar conductive material, and
   wherein the organic linker is a compound comprising a hydrophobic structure and a substituent comprising a polar functional group.

2. The negative electrode active material of claim 1, wherein the hydrophobic structure of the organic linker comprises one or more selected from the group consisting of a ring having a π-electron conjugated structure and a C3-C20 alkylene structure.

3. The negative electrode active material of claim 2, wherein the ring having the π-electron conjugated structure comprises one or more selected from the group consisting of benzene, pyrene, naphthalene, anthracene, benzopyrene, phenanthrene, fluoranthene, chrysene, perylene, benz[a]anthracene, acenaphthylene, coronene, triphenylene, and tetracene.

4. The negative electrode active material of claim 2, wherein the ring having the π-electron conjugated structure is a polycyclic ring having four or more rings, wherein the four or more rings are linked.

5. The negative electrode active material of claim 1, wherein the substituent comprising the polar functional group is one or more selected from the group consisting of a carboxyl group, a carboxylate group, a phosphoric acid group, a phosphate group, a sulfuric acid group, a sulfate group, and a C1-C8 alkyl group substituted with a carboxyl group, a carboxylate group, a phosphoric acid group, a phosphate group, a sulfuric acid group, or a sulfate group.

6. The negative electrode active material of claim 1, wherein the organic linker is one or more selected from the group consisting of 1-pyreneacetic acid, 1-pyrenecarboxylic acid, 1-pyrenebutyric acid, sodium dodecyl sulfonate, and sodium dodecylbenzenesulfonate.

7. The negative electrode active material of claim 1, wherein the active material core is one or more selected from the group consisting of Si, SiO$_x$, wherein 0<x<2, Sn, SnO$_2$, and an Si-metal alloy.

8. The negative electrode active material of claim 1, wherein the linear conductive material is one or more selected from the group consisting of a carbon fiber, a carbon nanofiber (CNF), a metal fiber, a metal nanotube, a carbon nanotube (CNT), and a conductive whisker, and
   wherein the planar conductive material is one or more selected from the group consisting of graphene, a metal thin film, and a MXene.

9. The negative electrode active material of claim 1, wherein the conductive material is present in an amount of 0.05 part by weight to 12 parts by weight relative to 100 parts by weight of the active material core in the negative electrode active material.

10. A negative electrode for a lithium secondary battery, comprising:
- a negative electrode current collector; and
- a negative electrode active material layer formed on the negative electrode current collector,
- wherein the negative electrode active material layer comprises:
- a negative electrode material comprising the negative electrode active material of claim 1; and
- a binder.

11. A lithium secondary battery comprising:
- the negative electrode for the lithium secondary battery of claim 10;
- a positive electrode opposite of the negative electrode for the lithium secondary battery;
- a separator interposed between the negative electrode for the lithium secondary battery and the positive electrode; and
- an electrolyte.

\* \* \* \* \*